US008272485B2

(12) United States Patent
Yoshida et al.

(10) Patent No.: US 8,272,485 B2
(45) Date of Patent: Sep. 25, 2012

(54) HYDRAULIC CONTROL UNIT FOR A HYDRAULIC POWER TRANSMISSION

(75) Inventors: Michio Yoshida, Susono (JP); Yuji Hattori, Gotenba (JP); Toshiya Yamashita, Toyota (JP); Kenta Kimura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 417 days.

(21) Appl. No.: 12/596,727

(22) PCT Filed: Apr. 21, 2008

(86) PCT No.: PCT/JP2008/058160
§ 371 (c)(1),
(2), (4) Date: Jan. 26, 2010

(87) PCT Pub. No.: WO2008/130059
PCT Pub. Date: Oct. 30, 2008

(65) Prior Publication Data
US 2010/0126163 A1 May 27, 2010

(30) Foreign Application Priority Data
Apr. 20, 2007 (JP) .................. 2007-112182

(51) Int. Cl.
F16D 33/06 (2006.01)
F16D 33/18 (2006.01)
F16D 25/12 (2006.01)
(52) U.S. Cl. ...................... 192/3.3; 192/85.63
(58) Field of Classification Search ............... 192/3.29, 192/3.3, 85.63
See application file for complete search history.

(56) References Cited

U.S. PATENT DOCUMENTS 4,051,932 A * 10/1977 Arai et al. ...................... 192/3.3
4,152,894 A * 5/1979 Rumyantsev et al. ......... 192/3.3
4,843,918 A * 7/1989 Morimoto .................... 192/3.31
7,819,768 B2 * 10/2010 Kinugasa et al. ................. 475/5
7,992,385 B2 * 8/2011 Shimizu et al. .................. 60/337

FOREIGN PATENT DOCUMENTS

| JP | 63 297852 | 12/1988 |
| JP | 2004-353680 | 12/2004 |
| JP | 2004 353694 | 12/2004 |
| JP | 2006-052766 | 2/2006 |

OTHER PUBLICATIONS

Decision to Grant a Patent issued Jul. 26, 2011, in Japanese Patent Application No. 2007-0112182, filed Apr. 20, 2007.

* cited by examiner

*Primary Examiner* — David D Le
*Assistant Examiner* — Jacob S Scott
(74) *Attorney, Agent, or Firm* — Oblon, Spivak, McClelland, Maier & Neustadt, L.L.P.

(57) ABSTRACT

A hydraulic control unit provided with oil pumps includes a first oil discharging outlet and a second oil discharging outlet, a high pressure route connected with the first oil discharging outlet, a medium pressure route with an oil pressure therein being lower than that in the high pressure route, a low pressure route with an oil pressure therein being lower than that in the medium pressure route, and a connection mode switching mechanism for selectively connecting a second oil discharging outlet with the high pressure route, the medium pressure route or the low pressure route. The connection mode switching mechanism includes a changeover valve selectively connecting the second oil discharging outlet with the medium pressure route or the low pressure route; and a changeover valve controlling device connecting the second oil discharging outlet with any of the medium pressure route and the low pressure route. The hydraulic control unit can minimize drive loss of an oil pump.

4 Claims, 4 Drawing Sheets

HYDRAULIC CONTROL UNIT FOR A HYDRAULIC POWER TRANSMISSION

TECHNICAL FIELD

This invention relates to a hydraulic control unit comprising an oil pump having a plurality of oil discharging outlets.

BACKGROUND ART

In general, mechanisms such as a transmission, a clutch and so on are arranged on a power transmission route of a vehicle from a prime mover to a wheel, and those mechanisms are actuated by a hydraulic control unit. One example of this kind of hydraulic control unit is disclosed in Japanese Patent Laid-Open No. 2004-353694.

The hydraulic control unit taught by Japanese Patent Laid-Open No. 2004-353694 comprises a plurality of oil pumps including a main pump and a sub pump driven by at least one of an engine and a motor. According to the teachings of Japanese Patent Laid-Open No. 2004-353694, an oil discharging outlet of the main pump is connected with a first oil requiring portion thorough a first oil passage. A primary regulator valve is arranged on a route from the first oil passage to a second oil passage connected with a second oil requiring portion. Further, a secondary regulator valve is arranged on a route from the second oil passage to a third oil passage. An oil discharging outlet of the sub oil pump is divided into two directions, and one of the oil discharging outlets of the sub oil pump is connected with the first oil passage through a first check valve. The other oil discharging outlet of the sub oil pump is connected with a changeover valve, and the changeover valve is connected with the secondary regulator valve. The other oil discharging outlet of the sub oil pump can also be connected with the second oil passage through a second check valve. The third oil passage is connected with the main pump and a suction inlet of the sub oil pump.

Operating oil discharged from the main oil pump is fed to the first oil requiring portion through the first oil passage. In case oil pressure in the first oil passage is raised, an amount of the operating oil discharged from the first oil passage to the second oil passage through the primary regulator valve is increased. That is, the oil pressure in the first oil passage is controlled by an action of the primary regulator valve. On the other hand, the operating oil in the second oil passage is fed to the second oil requiring portion. In case the oil pressure in the second oil passage is raised, an amount of the operating oil discharged from the second oil passage to the third oil passage is increased.

In case oil presser in the oil discharging outlet of the sub oil pump is higher than that in the first oil passage, the first check valve is opened to feed the operating oil discharged from the sub oil pump to the first oil passage. To the contrary, in case the oil presser in the oil discharging outlet of the sub oil pump is lower than that in the first oil passage, the first check valve is closed. When the changeover valve is opened, the oil discharged from the sub oil pump is fed to an inlet of the second check valve through the changeover valve. Here, in case the oil pressure in the second oil passage is relatively low, the secondary regulator valve is closed and the second check valve is opened. As a result, the operating oil discharged from the sub oil pump is fed to the second oil passage. To the contrary, in case the oil pressure in the second oil passage is relatively high, the secondary regulator valve is opened, and the operating oil in the second oil passage is discharged to the third oil passage. When the primary regulator valve is opened, the operating oil discharged from the sub oil pump is fed to the third oil passage through the changeover valve and the secondary regulator valve. According to the configuration thus far explained, the oil pressure in the second oil passage is lower than that in the first oil passage, and the oil pressure in the third oil passage is lower than that in the second oil passage. Thus, according to the hydraulic control unit taught by Japanese Patent Laid-Open No. 2004-353694, the primary regulator valve is opened and closed according to a change in the oil pressure in the second oil passage, and the oil discharging outlet of the sub oil pump is connected selectively with the second and the third oil passages.

According to the hydraulic control unit taught by Japanese Patent Laid-Open No. 2004-353694, however, in case a property determining a relation between the oil pressure in the second oil passage and the amount of the oil required by the second oil requiring portion is changed, the secondary regulator valve is closed if the oil pressure in the second oil passage is low, and the operating oil discharged from the sub oil pump is thereby further fed to the second oil passage, in spite of the amount of the oil in the second oil requiring portion is sufficient. As a result, a drive loss of the sub oil pump may become worse.

DISCLOSURE OF THE INVENTION

The present invention has been conceived noting the technical problems thus far described, and its object is to provide a hydraulic control unit capable of suppressing increase in a drive loss of an oil pump.

In order to achieve the above-mentioned object, according to the present invention, there is provided a hydraulic control unit having an oil pump comprising a plurality of oil discharging outlets, a high pressure route connected with a first oil discharging outlet of said plurality of oil discharging outlets, a medium pressure route an oil pressure therein is lower than that in the high pressure route, a low pressure route an oil pressure therein is lower than that in the medium pressure route, and a connection mode switching mechanism for selectively connecting a second oil discharging outlet of said plurality of oil discharging outlets with the high pressure route, the medium pressure route or the low pressure route, characterized: in that the connection mode switching mechanism comprises a changeover valve for selectively connecting the second oil discharging outlet with the medium pressure route or the low pressure route; and by comprising a changeover valve controlling device for switching a connection mode of the second oil discharging outlet by controlling the changeover valve on the basis of a required amount of operating oil to be fed to the medium pressure route, between: a first connection mode in which the second oil discharging outlet is connected with the medium pressure route and disconnected from the low pressure route; and a second connection mode in which the second oil discharging outlet is connected with the low pressure route and disconnected from the medium pressure route.

A vehicle to which the hydraulic control unit is applied comprises a hydraulic power transmission, which is adapted to transmit power between an input rotary member and an output rotary member thereof by a kinetic energy of fluid, and which is arranged on a power transmission route from a prime mover of the vehicle to a wheel. The hydraulic power transmission comprises a lock-up clutch for transmitting the power between the input rotary member and the output rotary member, a hydraulic chamber for engaging the lock-up clutch, and a hydraulic chamber for disengaging the lock-up clutch. The operating oil in the medium pressure route is fed to the hydraulic chamber for engaging the lock-up clutch and to the hydraulic chamber for disengaging the lock-up clutch. The lock-up clutch is disengaged in case the oil pressure in the hydraulic chamber for disengaging the lock-up clutch is raised, and engaged in case the oil pressure in the hydraulic chamber for engaging the lock-up clutch is raised. The changeover valve controlling device is adapted to select the first connection mode in case of disengaging the lock-up clutch, and to select the second connection mode in case of engaging the lock-up clutch.

More specifically, the connection mode switching mechanism is adapted to connect the second oil discharging outlet with the high pressure route in case relatively large amount of the operating oil is required to be fed to the high pressure route, while disconnecting from the medium pressure route and the low pressure route.

The hydraulic control unit of the present invention further comprises a solenoid valve for outputting a signal pressure for engaging and disengaging the lock-up clutch, and the changeover valve controlling device is adapted to selectively switch the connection mode of the second oil discharging outlet between the first and the second connection modes by controlling the changeover valve by the signal pressure outputted from the solenoid valve.

According to the present invention, the operating oil discharged from the first oil discharging outlet of the plurality of oil discharging outlets is fed to the high pressure route, and the operating oil discharged from the second oil discharging outlet of the plurality of oil discharging outlets is fed selectively to the high pressure route, to the medium pressure route, or to the low pressure route. In addition, a connection mode of the second oil discharging outlet is switched selectively between the first connection mode in which the second oil discharging outlet is connected with the medium pressure route and disconnected from the low pressure route, and the second connection mode in which the second oil discharging outlet is connected with the low pressure route and disconnected from the medium pressure route, by controlling the changeover valve on the basis of a required amount of operating oil to be fed to the medium pressure route. Therefore, in case the required amount of the operating oil to be fed to the medium pressure route is small, the second oil discharging outlet is connected with the low pressure route and disconnected from the medium pressure route by selecting the second connection mode. Here, as described, the oil pressure in the medium pressure route is lower than that in the high pressure route, and the oil pressure in the low pressure route is lower than that in the medium pressure route. That is, in case the second connection mode is selected, a driving load of the oil pump is lower than that of the case in which the first connection mode is selected. For this reason, an increase in the power loss resulting from driving the oil pump can be suppressed.

According to the present invention, power of the prime mover of the vehicle is transmitted to the wheel through the hydraulic power transmission, and the transmission torque or a torque capacity between the input rotary member and the output rotary member of the hydraulic power transmission is controlled by controlling the pressure of the operating oil being fed to the oil chamber from the medium pressure route to engage or disengage the lock-up clutch. Here, in case of engaging the lock-up clutch, the required amount of the operating oil to be fed to the medium pressure route is smaller than that in the case of disengaging the lock-up clutch. Therefore, in case of disengaging the lock-up clutch, the first connection mode is selected. To the contrarily, in case of engaging the lock-up clutch, the second connection mode is selected. As a result, the operating oil can be prevented from being discharged from the second oil discharging outlet thereby suppressing an increase in the power loss.

Moreover, according to the present invention, in case the required amount of the operating oil to be fed to the high pressure route is large, the second oil discharging outlet can be connect with the high pressure route and disconnected from the medium pressure route and the low pressure route.

Further, according to the present invention, the lock-up clutch is engaged and disengaged by the signal pressure outputted from the solenoid valve, and the connection mode of the second oil discharging outlet is switched between the first connection mode and the second connection mode by controlling the changeover valve by the signal pressure outputted from the solenoid valve. Therefore, no additional solenoid valve is required to control the changeover valve.

BEST MODE FOR CARRYING OUT THE INVENTION

Figure 1:
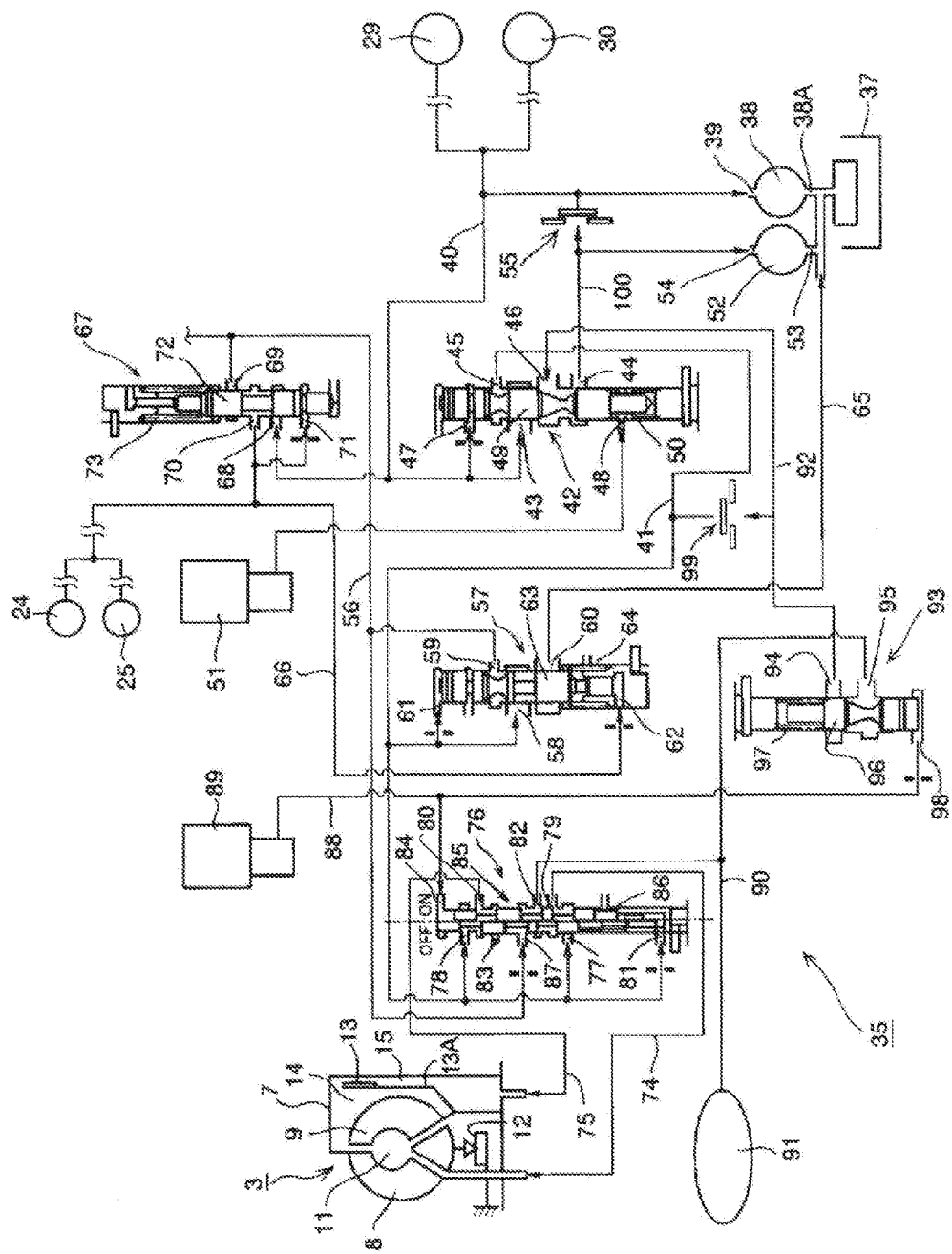
FIG. 1 is a view showing an exemplary embodiment of the hydraulic control unit according to the present invention.

Next, this invention will be described in connection with its specific examples. The hydraulic control unit according to the present invention is used to control a power transmission unit arranged on a route from a prime mover of a vehicle to a wheel. The prime mover is a power unit for generating power to be transmitted to the wheel, and not only a single prime mover but also plurality of the prime movers can be mounted on the vehicle. Different kinds of prime movers of different power generation principles such as an engine, an electric motor, a hydraulic motor, a flywheel system and so on may be used as the prime mover. According to the present invention, the vehicle includes both of a two-wheel drive vehicle comprising a power train adapted to transmit the power of the prime mover to any of front wheels and rear wheels, and a four-wheel drive vehicle comprising a power train adapted to transmit the power of the prime mover to both front wheels and rear wheels. The oil pump is driven by any of the aforementioned prime movers or by a specific prime mover such as an electric motor, which is adapted to drive the oil pump only and whose power will not be transmitted to the wheel.

In addition, not only a single oil pump having a plurality of oil discharging outlets, but also a plurality of oil pumps having one oil discharging outlet may be used in the present invention. According to the present invention, at least two or more oil discharging outlets are required. In case a plurality of oil pumps is used, those oil pumps may be driven by a common prime mover but may also be driven individually by their own prime movers.

In case a hydraulically-controlled power transmission unit is used in the vehicle to transmit the power from the prime mover to the wheel, actions of movable members of the power transmission unit are controlled hydraulically by the operating oil fed thereto from the high pressure route, the medium pressure route and the low pressure route. For example, a transmission, a frictional engagement device, a hydraulic power transmission, a forward/backward switching mechanism and so on may be used as the power transmission unit. Specifically, the transmission is a mechanism which is adapted to change a ratio between an input rotational speed and an output rotational speed. According to the present invention, both of a continuously variable transmission adapted to change a speed change ratio thereof continuously (or steplessly), and a geared transmission adapted to change a gear ratio thereof stepwise (or discontinuously) may be used in the present invention. The continuously variable transmission includes a belt-type continuously variable transmission, a toroidal continuously variable transmission etc., and the geared transmission includes a planetary gear transmission, a selective gear transmission etc. Also, all of a multi disc type, single disc type and band type frictional engagement devices are applicable to the present invention, and the frictional engagement device includes a clutch and a brake. Specifically, the clutch is a mechanism for controlling a transmission torque or a torque capacity between rotary elements by a frictional force, and the brake is a mechanism for applying a frictional braking force to the rotary element.

The aforementioned hydraulic power transmission is a mechanism adapted to transmit the power between an input rotary element and an output rotary element thereof by a kinetic energy of fluid. Specifically, both of a torque converter capable of amplifying the torque, and a fluid coupling incapable of amplifying the torque are applicable to the hydraulic power transmission. The aforementioned lock-up clutch is a mechanism constituting another power transmission route in parallel with the hydraulic power transmission. Specifically, the lock-up clutch is adapted to control the transmission torque or the torque capacity between the input rotary member and the output rotary member of the hydraulic power transmission by a frictional force. The aforementioned forward/backward switching mechanism is situated downstream of an engine on a power transmission route to reverse a rotational direction of a rotary member. Here, both of a planetary gear mechanism and a gear pair with parallel axes are applicable to the forward/backward switching mechanism. The speed change ratio of the transmission, the transmission torque and an engaging pressure of the frictional engagement device, a speed ratio of the hydraulic power transmission and so on are controlled by an action of the movable member. Therefore, the oil chamber and the oil passages connected to the oil chamber are formed to control the action of the movable member.

The movable member includes a piston, a plate and a disc both of which are provided with a frictional material, a pulley and so on. According to the present invention, the elements constituting the oil passage for letting through the operating oil, specifically, the oil chamber, the oil passages, a valve arranged on the oil passage, a port of the valve and so on are included in the high pressure route, the medium pressure route and the low pressure route. That is, the high pressure route is a portion where a high pressure is required, the medium pressure route is a portion where a medium pressure is required, and the low pressure route is a portion where a low pressure is required. According to the present invention, the high pressure route is situated uppermost stream in the flowing direction of the operating oil discharged from the first oil discharging outlet. The medium pressure route is formed downstream of the high pressure route or connected with downstream end of the high pressure route. The low pressure route is formed downstream of the medium pressure route or connected with downstream end of the medium pressure route. According to the present invention, the definition of the expression "connecting the oil passage" is to allow the operating oil to flow between the oil passages bi-directionally or to flow into the oil passage from the oil discharging outlet. For this purpose, the oil passage may be connected always with another oil passage or with the oil discharging outlet. The oil passage may also be connected intermittently with another oil passage or the oil discharging outlet by an action of a valve. Alternatively, the oil passage may be connected selectively with one of the oil passages or one of the oil discharging outlets by a valve.

The transmission, the frictional engagement device and the hydraulic power transmission are arranged in tandem on the power transmission route from the prime mover to the wheel, and an order of arranging those elements is not limited to any specific order. Here, the aforementioned forward/backward switching mechanism is employed only in case the transmission is a continuously variable transmission. In this case, the forward/backward switching mechanism may be situated not only between the engine and the continuously variable transmission but also between the continuously variable transmission and the wheel. According to the present invention, specifically, the oil requiring portion to which the operating oil is fed from the low pressure route includes: the elements constituting the power transmission unit; a heat generating member or a slide member such as a bearing or the like supporting the element constituting the power transmission unit; and a cooling system and a lubricating system for cooling the heat generating member or the slide member. Here, the cooling system includes the oil passages, a tank or a jacket for holding the oil. The aforementioned oil requiring portion to which the operating oil is fed from the low pressure route further includes a suction inlet of the oil pump, an oil reservoir such as the oil tank, an oil pan or the like. As described, according to the present invention, the connection mode switching mechanism is adapted to selectively connect the second oil discharging outlet with the high pressure route, the medium pressure route or the low pressure route, and the connection mode switching mechanism comprises the oil passage, and a valve for switching the oil passage to feed the operating oil. As also described, the power transmission unit is a mechanism for transmitting the torque, and the rotary element and the rotary member thereof include a gear, a rotating shaft, a connecting drum, a roller, a carrier, a pulley, a sprocket and so on. Further, according to the present invention, the oil serves as the operating oil when used for operating the movable members, and also serves as a lubricant when fed to the heating member or the slide member to cool and lubricate such a member.

Figure 2:
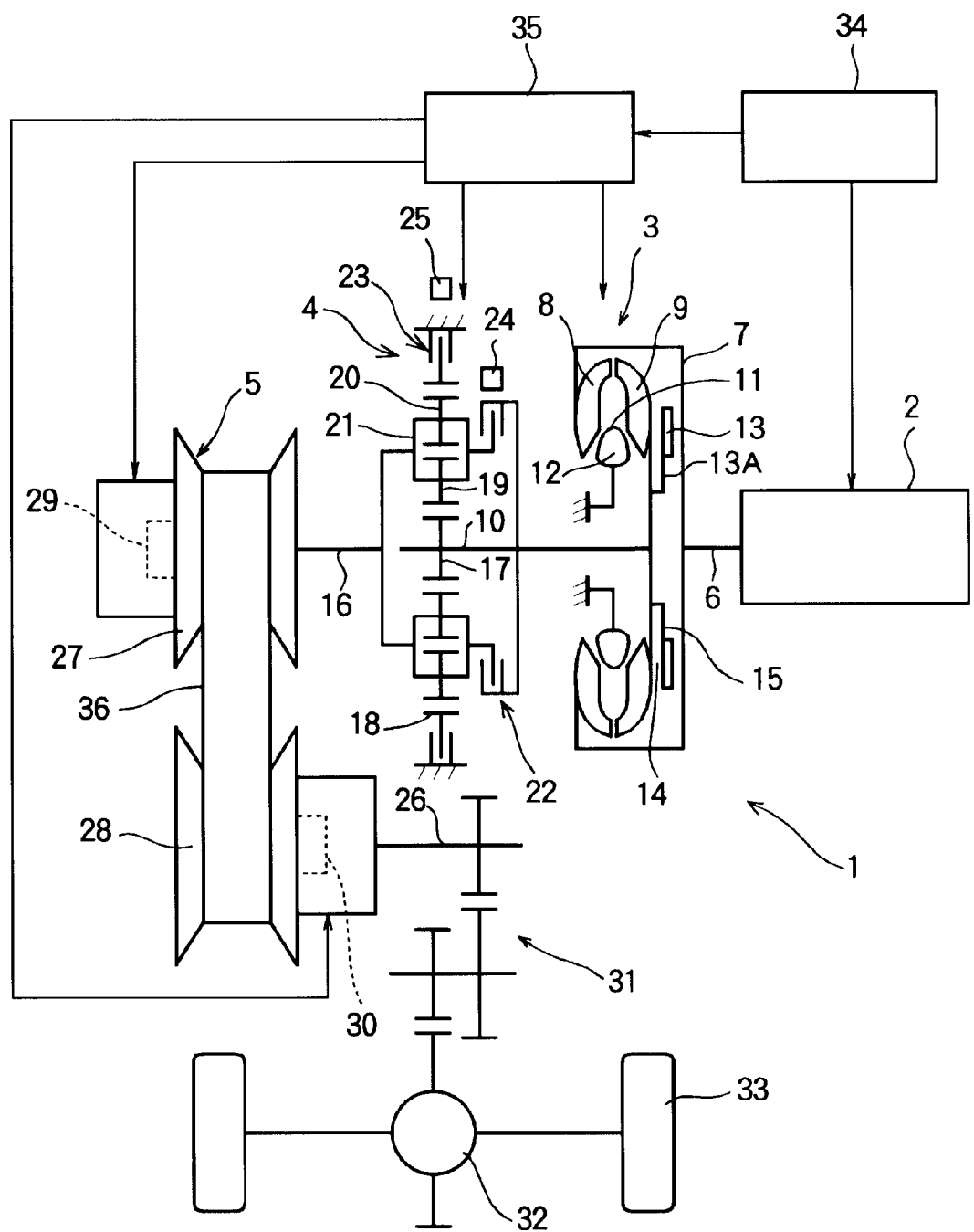
FIG. 2 is a view showing one example of a power train of a vehicle provided with the hydraulic control unit of the present invention, and a control system thereof.

An example of a power train and a control system thereof to which a hydraulic control unit of the present invention is applied is shown in FIG. 2. In the power train of a vehicle 1 shown in FIG. 2, a hydraulic power transmission such as a torque converter 3 is arranged in an output side of a prime mover 2. The torque outputted from the torque converter 3 is transmitted to a belt-type continuously variable transmission 5 through a forward/backward switching mechanism 4. That is, in the power train shown in FIG. 2, the forward/backward switching mechanism 4 is situated on a torque transmitting route between the torque converter 3 and the continuously variable transmission 5. According to the example shown in FIG. 2, at least one of an engine and an electric motor may be used as the prime mover of the vehicle 1. The engine is a power unit adapted to convert thermal energy into kinetic energy by combusting a fuel. For example, an internal combustion engine such as a gasoline engine, a diesel engine, LPG engine and so on may be used as the prime mover 2. On the other hand, the electric motor is a rotation device adapted to convert electric energy into kinetic energy, and both AC and DC motors may be used as the prime mover 2. In addition, a motor generator capable of functioning not only as a motor but also as a generator may also be used instead of the electric motor. However, in the example to be explained hereinafter, an internal combustion engine is used as the prime mover 1, and the prime mover 2 will be called as the "engine 2" for the sake of convenience. An electric throttle valve (not shown) is arranged on a suction conduit (also not shown) of the engine 2, and the engine 2 comprises a crankshaft 6.

The aforementioned torque converter 3 is arranged on an output side of the crankshaft 6 so that the power of the engine 2 can be transmitted to the torque converter 3 from the crankshaft 6. As described, the torque converter 3 is a hydraulic power transmission adapted to transmit the power between an input rotary member and an output rotary member thereof by a kinetic energy of the operating oil. The torque converter 3 comprises a hollow casing 7, a pump impeller 8 and a turbine runner 9 provided in the casing 7, and the pump impeller 8 is connected with the crankshaft 6 in a power transmittable manner by the casing 7. On the other hand, the turbine runner 9 is connected with an input shaft 10 to be rotated integrally. That is, the casing 7 serves as an input member of the torque converter 3, and the input shaft 10 serves as an output member of the torque converter 3. Those pump impeller 8 and turbine runner 9 are provided individually with a plurality of blades (not shown), and an oil chamber 11 of the torque converter 3 is formed between the pump impeller 8 and the turbine runner 9. Therefore, the operating oil is fed through the oil chamber 11, and the power is transmitted to the turbine runner 9 by the kinetic energy of the operating oil resulting from a rotation of the pump impeller 8. A stator 12 is arranged inside of the pump impeller 8 and the turbine runner 9. The stator 12 is adapted to allow the operating oil fed from the turbine runner 9 flowing into the pump impeller 8 while changing a flowing direction of the operating oil. Therefore, the torque transmitted between the pump impeller 8 and the turbine runner 9 can be amplified by the action of the stator 12. In addition, a fluid coupling, which is incapable of amplifying the torque, may also be used as the hydraulic power transmission instead of the torque converter 3.

Further, a lock-up clutch 13 is provided to connect the casing 7 with the input shaft 10, and disconnect the casing 7 from the input shaft 10. The lock-up clutch 13 is a mechanism adapted to transmit the power by a friction force, and the lock-up clutch 13 comprises a disc-shaped plate 13A adapted to rotate together with the input shaft 10 and to move along the input shaft 10, and a frictional material attached to the plate 13A. The torque being transmitted by the lock-up clutch 13 is controlled by moving the plate 13A along the input shaft 10 to control a contact pressure between the friction material and a front cover of the casing 7. In order to control the transmission torque of the lock-up clutch 13, a hydraulic chamber 14 for engaging the lock-up clutch 13 and a hydraulic chamber 15 for disengaging the lock-up clutch 13 are formed in the casing 7 across the plate 13A. Therefore, the plate 13A is moved along the input shaft 10 according to a pressure difference between the hydraulic chambers 14 and 15 thereby engaging and disengaging the lock-up clutch 13. Specifically, in case the pressure in the hydraulic chamber 14 is raised higher than that in the hydraulic chamber 15, the frictional material is pushed onto the front cover to increase a friction. As a result, the torque being transmitted by the lock-up clutch 13 is increased, that is, the lock-up clutch 13 is engaged.

To the contrary, in case the pressure in the hydraulic chamber 14 is lowered lower than that in the hydraulic chamber 15, the frictional material is disengaged from the front cover and the torque being transmitted by the lock-up clutch 13 is thereby reduced. According to this example, in case the lock-up clutch 13 is disengaged, the power cannot be transmitted frictionally by the lock-up clutch 13. To the contrary, in case the lock-up clutch 13 is engaged, the power can be transmitted frictionally by the lock-up clutch 13. In addition, in this example, a definition of the "engagement of the lock-up clutch 13" includes a "slip of the lock-up clutch 13". This means that the power can be transmitted frictionally by the lock-up clutch 13 even in case the lock-up clutch 13 is slipping. The oil chamber 11 of the torque converter 3 is communicated with the hydraulic chamber 14. Therefore, the oil pressure in the hydraulic chamber 14 is raised in case the oil pressure in the oil chamber 11 is raised, and the oil pressure in the hydraulic chamber 14 is lowered in case the oil pressure in the oil chamber 11 is lowered.

The forward/backward switching mechanism 4 is adapted to switch the rotational direction of a primary shaft 16 of the continuously variable transmission 5 between a rotational direction of the input shaft 10 and a counter direction of the rotational direction of the input shaft 10. In the example shown in FIG. 2, a double-pinion type planetary gear mechanism is used as the forward/backward switching mechanism 4. Specifically, the forward/backward switching mechanism 4 comprises a sun gear 17 adapted to rotate together with the input shaft 10, a ring gear 18 arranged coaxially with the sun gear 17, a pinion gear 19 meshing with the sun gear 17, and a pinion gear 20 meshing with the pinion gear 19 and the ring gear 18. Those pinion gears 19 and 20 are held by a carrier 21 in a rotatable and revolvable manner. In addition, the forward/backward switching mechanism 4 further comprises: a forward clutch 22 adapted to selectively connect the input shaft 10 and the carrier 21 in a power transmittable manner, and disconnect the input shaft 10 from the carrier 21; and a reverse brake 23 adapted to switch the rotational direction of a primary shaft 16 between the rotational direction of the input shaft 10 and a counter direction of the rotational direction of the input shaft 10 by fixing the ring gear 18 selectively. In this example, hydraulically controlled clutch and brake are used as the forward clutch 22 and the reverse brake 23. Further, a hydraulic chamber 24 is provided to control the torque transmitted by the forward clutch 22, and a hydraulic chamber 25 is provided to control a braking force or a torque capacity of the reverse brake 23.

The belt-type continuously variable transmission 5 comprises a primary shaft 16 and a secondary shaft 26 arranged parallel to each other. Specifically, the primary shaft 16 is rotated integrally with a primary pulley 27, and the secondary shaft 26 is rotated integrally with a secondary pulley 28. The primary pulley 27 comprises a fixed sheave (not shown) which is not allowed to move in an axial direction of the primary shaft 16, and a movable sheave (not shown) which is allowed to move in the axial direction of the primary shaft 16. The movable sheave of the primary pulley 27 is moved by a primary hydraulic chamber 29 in the axial direction of the primary shaft 16 to control a width of a groove between the fixed sheave and the movable sheave. The secondary pulley 28 also comprises a fixed sheave (not shown) which is not allowed to move in an axial direction of the secondary shaft 26, and a movable sheave (not shown) which is allowed to move in the axial direction of the secondary shaft 26. The movable sheave of the secondary pulley 28 is moved by a secondary hydraulic chamber 30 in the axial direction of the secondary shaft 26 to control a width of a groove between the fixed sheave and the movable sheave. A differential 32 is connected with the secondary shaft 26 through a gear transmission 31, and (front) wheels 33 are connected with the differential 32.

Next, a control system of the vehicle shown in FIG. 2 will be explained hereinafter. As shown in FIG. 2, there is provided an electronic control unit (ECU) 34. For example, signals representing a rotation speed of the engine, a rotation speed of the primary shaft, a rotation speed of the secondary shaft 26, a vehicle speed, an acceleration demand, a braking demand, an oil temperature, an external temperature, a sift position and so on are inputted to the electronic control unit 34, and signals for controlling the engine, a hydraulic control unit 35 and so on are outputted from the electronic control unit 34. The aforementioned lock-up clutch 13 is engaged and disengaged by the hydraulic control unit 35, that is, the torque transmitted by the lock-up clutch 13 is controlled by the hydraulic control unit 35. In addition, an engaging pressure of the forward clutch 22 or the torque transmitted by the forward clutch 22, an engaging pressure of the reverse brake 23 or a braking force of the reverse brake 23, a speed change ratio of the continuously variable transmission 5, and a torque transmitted by the continuously variable transmission 5 are controlled by the hydraulic control unit 35. In order to control the above-mentioned elements, various kinds of data are stored in the electronic control unit 34. Specifically, a map for obtaining a target output of the engine on the basis of a vehicle speed and an acceleration demand, a map for controlling engagement, disengagement and slip of the lock-up clutch 13, a map for controlling the speed change ratio of the continuously variable transmission 5, a map for controlling the torque transmitted by the continuously variable transmission 5 and so on are stored in the electronic control unit 34.

In the vehicle 1 thus structured, the torque outputted from the engine 2 is transmitted to the wheel 33 through the torque converter 3, the forward/backward switching mechanism 4, and the belt-type continuously variable transmission 5. Here will be explained a control of the lock-up clutch 13. In case the oil pressure in the hydraulic chamber 14 is raised to engage the lock-up clutch 13, the power is transmitted by a frictional force. To the contrary, in case the oil pressure in the hydraulic chamber 15 is raised to disengage the lock-up clutch 13, the power is transmitted by a kinetic energy of the operating oil. In case the lock-up clutch 13 of the torque converter 3 is disengaged, a speed ratio between the casing 7 and the input shaft 10 becomes smaller than 1.0 so that the lock-up clutch 13 is brought into a torque converter range. As a result, the stator 12 functions to amplify the torque. To the contrary, in case the speed ratio between the casing 7 and the input shaft 10 is closer to 1.0 than the torque converter range, that is, in case the lock-up clutch 13 is in a coupling range, the torque is not amplified.

The engine torque is thus transmitted to the input shaft 10. Next, a control of the forward/backward switching mechanism 4 will be explained hereinafter. In case a shift position is in a forward position, for example, in case D (i.e., Drive) position is selected, the oil pressure in the hydraulic chamber 24 is raised to engage the forward clutch 22, and the oil pressure in the hydraulic chamber 25 is lowered to disengage the reverse brake 23. As a result, the input shaft 10 and the carrier 21 are rotated integrally so that the torque of the input shaft 10 is transmitted to the primary shaft 16. To the contrary, in case a reverse position is selected, the oil pressure in the hydraulic chamber 24 is lowered to disengage the forward clutch 22, and the oil pressure in the hydraulic chamber 25 is raised to engage the reverse brake 23. That is, the ring gear 18 is fixed. In this situation, when the engine torque is transmitted to the sun gear 17, the ring gear 18 functions as a reaction element and the torque of the sun gear 17 is transmitted to the primary shaft 16 through the carrier 21. In this case, the rotational direction of the primary shaft 16 is opposite to that of the case in which the forward position is selected.

Next, a control of the belt-type continuously variable transmission 5 will be explained hereinafter. As explained, the engine torque is transmitted to the primary shaft 16, and the speed change ratio and the torque capacity of the continuously variable transmission 5 are controlled on the basis of the signals inputted to the electronic control unit 34 and the data stored in the electronic control unit 34. A control of the speed change ratio of the belt-type continuously variable transmission 5 will be explained first of all. When the groove width of the primary pulley 27 is changed, a radius of a belt 36 applied to the primary pulley 27 is varied continuously thereby changing the speed change ratio continuously. Specifically, in case a feeding amount of the operating oil to the primary hydraulic chamber 29 is increased thereby raising the oil pressure in the primary hydraulic chamber 29, the radius of the belt 36 on the primary pulley 27 is increased. As a result, the speed change ratio of the continuously variable transmission 5 is decreased, in other words, an upshifting of the continuously variable transmission 5 is achieved. To the contrary, in case the feeding amount of the operating oil to the primary hydraulic chamber 29 is decreased thereby lowering the oil pressure in the primary hydraulic chamber 29, the radius of the belt 36 on the primary pulley 27 is reduced. As a result, the speed change ratio of the continuously variable transmission 5 is increased, in other words, a downshifting of the continuously variable transmission 5 is achieved. In case the feeding amount of the oil to the primary hydraulic chamber 29 is kept constant thereby keeping the oil pressure in the primary hydraulic chamber 29 constant, the radius of the belt 36 on the primary pulley 27 is kept constant. That is, the speed change ratio of the continuously variable transmission 5 is kept constant.

On the other hand, a clamping pressure of the secondary pulley 28 to clump the belt 36 is adjusted by controlling the oil pressure in the secondary hydraulic chamber 30. Specifically, in case the oil pressure in the secondary hydraulic chamber 30 is raised, the torque transmitted by the continuously variable transmission 5 is increased. To the contrary, in case the oil pressure in the secondary hydraulic chamber 30 is lowered, the torque transmitted by the continuously variable transmission 5 is decreased. In case the oil pressure in the secondary hydraulic chamber 30 is kept constant, the torque transmitted by the continuously variable transmission 5 becomes constant. The torque transmitted by the belt 36 between the primary pulley 27 and the secondary pulley 28 is thus controlled. The hydraulic control unit 35 has a function to control the lock-up clutch 13, the forward/backward switching mechanism 4, and the belt-type continuously variable transmission 5 thus structured, and a function to feed the lubrication oil to the heat generating member or the slide member of the power transmission unit. An exemplary embodiment of the hydraulic control unit 35 will be explained hereinafter.

FIG. 1 shows an exemplary embodiment of the hydraulic control unit 35. First of all, a main oil pump 38 is provided to suck the oil in an oil pan 37. A driving source of the main oil pump 38 is not limited to the engine 2 but an electric motor (not shown) may be arranged optionally to drive the main oil pump 38. A suction inlet 38A of the main oil pump 38 is connected with the oil pan 37, and an oil discharging outlet 39 of the main oil pump 38 is connected with an oil passage 40. A speed change ratio control valve (not shown) is arranged on a route from the oil passage 40 to the primary hydraulic chamber 29. Specifically, the speed change ratio control valve is a flow control valve adapted to control an amount of the oil fed to the primary hydraulic chamber 29 and an amount of the oil discharged from the primary hydraulic chamber 29. Meanwhile, a pressure control valve (not shown) is arranged on a route from the oil passage 40 to the secondary hydraulic chamber 30. The pressure control valve is adapted to control the oil pressure in the secondary hydraulic chamber 30. Behaviors of both of the speed change ratio control valve and the pressure control valve are controlled by the electronic control unit 34.

The oil passage 40 is connected with an oil passage 41 through a primary regulator valve 42. The primary regulator valve 42 is a known pressure control valve for regulating an oil pressure in the oil passage 40, comprising input ports 43 and 44, output ports 45 and 46, a feedback port 47, a signal pressure port 48, a spool 49, and a spring 50. The spool 49 is allowed to move in its axial direction, and a signal pressure is inputted to the signal pressure port 48 from a solenoid valve 51 for regulating a line pressure. A pushing force according to the pressure of the signal pressure port 48 and a pushing force of the spring 50 are applied to the spool 49 in the same direction. Both of the aforementioned input port 43 and the feedback port 47 are connected with the oil passage 40. A pushing force according to the pressure of the feedback port 47 is applied to the spool 49 in a direction opposite to the direction of the pushing force of the spring 50. The output port 45 is connected with the oil passage 41, and the input port 44 is connected with an oil passage 100.

Thus, the spool 49 is moved in its axial direction and stopped by the above-mentioned pressures. As a result, a communicating area between the input port 43 and the output port 45, and a communicating area between the input port 44 and the output port 46 are varied. In addition to the main oil pump 38, there is provided a sub oil pump 52, and a suction inlet 53 thereof is connected with the oil pan 37. On the other hand, an oil discharging outlet 54 of the sub oil pump 52 is connected with the oil passage 100. The sub oil pump 52 is driven by a torque of the engine 2 or a torque of its own driving source. The oil passage 100 is connected with the oil passage 40 through a check valve 55. In case a pressure in the oil passage 100 is higher than that in the oil passage 40, the check valve 55 is opened. To the contrary, in case the pressure in the oil passage 100 is lower than that in the oil passage 40, the check valve 55 is closed.

The oil passage 41 is connected with an oil passage 56 through a secondary regulator valve 57. The secondary regulator valve 57 is a known pressure control valve for regulating an oil pressure in the oil passage 41, comprising an input port 58, an output port 59, a drain port 60, a feedback port 61, a control port 62, a spool 63, and a spring 64. The spool 63 is allowed to move in its axial direction, and the oil passage 41 is connected with the input port 58 and the feedback port 61. The output port 59 is connected with the oil passage 56, and the drain port 60 is connected with the suction inlets 38A and 53 through the oil passage 65. The control port 62 is connected with the oil passage 66, and a pushing force according to the pressure of the control port 62 and a pushing force of the spring 64 are applied to the spool 63 in the same direction. Meanwhile, a pushing force according to the pressure of the feedback port 61 is applied to the spool 63 in a direction opposite to the direction of the pushing force of the spring 64. The spool 63 is thus moved in its axial direction by the above-explained pushing forces thereby connecting the input port 58 with the output port 59 and the drain port 60, and disconnecting the input port 58 from the output port 59 and the drain port 60.

The oil passage 66 is connected with the hydraulic chambers 24 and 25 through a manual valve not shown which is actuated by shifting the shift position. The reference numeral 67 shown in FIG. 1 represents a modulator valve to which the oil passages 66, 40 and 56 are connected. The modulator valve 67 is a known valve comprising input ports 68 and 69, an output port 70, a feedback port 71, a spool 72, and a spring 73. The spool 72 is allowed to move in its axial direction, the input port 68 is connected with the oil passage 40, the input port 69 is connected with the oil passage 56, and the output port 70 and the feedback port 71 are connected with the oil passage 66. A pushing force according to the pressure of the feedback port 71 is applied to the spool 72 in its axial direction. Meanwhile, a pushing force of the spring 73 is applied to the spool 72 in a direction opposite to the direction of the pushing force of the feedback port 71.

An oil passage 74 is connected with the oil chamber 11, and an oil passage 75 is connected with the hydraulic chamber 15. The reference numeral 76 in FIG. 1 represents a lock-up control valve for connecting the oil passage 41 with the oil passages 74 and 75. The lock-up control valve 76 is a known valve adapted to engage and disengage the lock-up clutch 13, and the lock-up control valve 76 comprises input ports 77, 78 and 87, output ports 79 and 80, a feedback port 81, drain ports 82 and 83, a signal pressure port 84, a spool 85 and a spring 86. The spool 85 is allowed to move in its axial direction, and the oil passage 41 is connected with the input ports 78 and 77, and the feedback port 81. The output port 79 is connected with the oil passage 74, the output port 80 is connected with the oil passage 75, and the input port 87 is connected with the oil passage 56. A solenoid valve 89 for controlling the lock-up clutch 13 is connected with the signal pressure port 84 through an oil passage 88. The solenoid valve 89 is adapted to output a signal pressure according to an applied current thereby engaging and disengaging the lock-up clutch 13. The signal pressure outputted from the solenoid valve 89 is inputted to the signal pressure port 84. A pushing force of the spring 86, and a pushing force according to the signal pressure of the signal pressure port 84 are applied to the spool 85 in the directions opposite to each other.

Both of the solenoid valve 51 for regulating a line pressure and the solenoid valve 89 for controlling the lock-up clutch 13 are adapted to output a signal pressure according to an applied current. The currents to be applied to those solenoid valves 51 and 89 are controlled by the electronic control unit 34. The drain port 83 is connected with the oil pan 37, and the drain port 82 is connected with lubricated members 91 through an oil passage 90. The lubricated members 91 comprises a mechanism for lubricating and cooling the heat generating members and the slide members such as elements constituting the belt-type continuously variable transmission 5, elements constituting the forward/backward switching mechanism 4, bearings holding the input shaft 10, the primary shaft 16, the secondary shaft 26 and so on. The lubricated members 91 further comprises an oil passage, a groove, a recess, a hole and an opening for letting through the operating oil, and an oil tank and a jacket for holding the operating oil.

An oil passage 92 is connected with the output port 46 of the primary regulator valve 42, and a changeover valve 93 is provided to selectively connect the oil passage 92 with the oil passage 90, and to disconnect the oil passage 92 from the oil passage 90. The changeover valve 93 comprises an input port 94, an output port 95, a spool 96 capable of moving in its axial direction, a spring 97 adapted to apply a pushing force to the spool 96 in the axial direction, and a signal pressure port 98. The oil passage 88 is connected with the signal pressure port 98, the oil passage 92 is connected with the input port 94, and the oil passage 90 is connected with the output port 95. The pushing force of the spring 97 is applied to the spool 96 in its axial direction, and a pushing force according to the signal pressure inputted to the signal pressure port 98 is applied to the spool 96 in the counter direction of the pushing force applied by the spring 97. The spool 96 is thus moved axially by the pushing force applied thereto between a connecting position in which the input port 94 and the output port 95 are connected, and a disconnecting position in which the input port 94 and the output port 95 are disconnected. Further, a check valve 99 is interposed between the oil passages 92 and 41. The check valve 99 is opened in case the pressure in the oil passage 92 is higher than that in the oil passage 41, and closed in case the oil pressure in the oil passage 92 is lower than that in the oil passage 41.

Next, a control example of the hydraulic control unit 35 will be explained hereinafter. When the main oil pump 38 is driven, the operating oil is sucked from the suction inlet 38A and discharged to the oil passage 40 from the oil discharging outlet 39. The operating oil fed to the oil passage 40 is then fed to the primary hydraulic chamber 29 and the secondary hydraulic chamber 30. In case the oil pressure in the oil passage 40 is low, the spool 49 of the primary regulator valve 42 is moved upwardly in FIG. 1 by the pushing force of the spring 50. As a result, the input port 43 and the output port 45 are disconnected. Therefore, the operating oil in the oil passage 40 will not be discharged to the oil passage 41. To the contrary, in case the oil pressure in the oil passage 40 is raised, the spool 49 of the primary regulator valve 42 is moved downwardly in FIG. 1 by the pushing force resulting from the pressure rise in the feedback port 47. As a result, the input port 43 and the output port 45 are communicated with each other. Consequently, the operating oil in the oil passage 40 is discharged to the oil passage 41. In case the operating oil is discharged from the oil passage 40 to the oil passage 41 and the oil pressure in the oil passage 40 is thereby lowered, the spool 49 is moved upwardly in FIG. 1 again by the pushing force of the spring 50. As a result, the input port 43 and the output port 45 are disconnected. Here, the oil pressure in the oil passage 40 for connecting the input port 43 and the output port 45 can be adjusted by the signal pressure inputted to the signal pressure port 48. Specifically, the oil pressure in the oil passage 40 for connecting the input port 43 and the output port 45 is raised in proportion to a rise in the signal pressure inputted to the signal pressure port 48. Thus, the oil pressure in the oil passage 40 (i.e., a line pressure) is controlled by the function of the primary regulator valve 42.

The operating oil is thus fed to the oil passage 41 by the function of the primary regulator valve 42, and the oil pressure in the oil passage 41 is lower than that in the oil passage 40. Hereinafter, a control to feed the operating oil in the oil passage 41 to the torque converter 3 through the lock-up control valve 76 is to be explained. First of all, in case the condition to engage the lock-up 13 is satisfied, the signal pressure outputted from the solenoid valve 89 is raised to high pressure. As a result, as shown in the right side of the lock-up control valve 76, the spool 85 is moved downwardly in FIG. 1 against the pushing force of the spring 86, and the input port 77 and the output port 79 are thereby connected. In this situation, the input port 78 is interrupted, and the output port 80 and the drain port 83 are connected. Therefore, the operating oil in the oil passage 41 is fed to the oil passage 74 via the lock-up control valve 76, and the operating oil fed to the oil passage 74 is further fed to the oil chamber 11 of the torque converter 3 and the hydraulic chamber 14. Meanwhile, the operating oil in the hydraulic chamber 15 is discharged from the drain port 83 through the oil passage 75. As a result, the oil pressure in the hydraulic chamber 14 becomes higher than that in the hydraulic chamber 15, and the lock-up 13 is thereby engaged.

To the contrary, in case the condition to disengage the lock-up 13 is satisfied, the signal pressure outputted from the solenoid valve 89 is lowered to low pressure. As a result, as shown in the left side of the lock-up control valve 76, the spool 85 is moved upwardly in FIG. 1 by the pushing force of the spring 86, and the input port 78 and the output port 80 are thereby connected. In this situation, the input port 77 is interrupted, and the output port 79 and the drain port 82 are connected. As a result, the operating oil in the oil passage 41 is fed to the oil passage 75 through the lock-up control valve 76, and then, the operating oil is fed from the oil passage 75 to the hydraulic chamber 15. The operating oil reaches the hydraulic chamber 15 is discharged from the drain port 82 through the oil passage 74. As a result, the oil pressure in the hydraulic chamber 15 becomes higher than that in the hydraulic chamber 14, and the lock-up 13 is thereby disengaged. Then, the operating oil discharged from the drain port 82 to the oil passage 90 is fed to the lubricated members 91.

Next, functions of the secondary regulator valve 57 will be explained hereinafter. In case the oil pressure in the oil passage 41 is low, the spool 63 is moved upwardly in FIG. 1 by the pushing force of the spring 64, and both of the output port 63 and the drain port 60 are thereby closed. Therefore, the operating oil in the oil passage 41 will not be discharged. To the contrary, in case the oil pressure in the oil passage 41 is raised, the spool 63 is moved downwardly in FIG. 1 by the pushing force according to the oil pressure of the feedback port 61, and the input port 58 is thereby connected with the output port 63 and the drain port 60. As a result, the operating oil in the oil passage 41 discharged to the oil passages 56 and 65. The operating oil discharged to the oil passage 65 is sucked into the main oil pump 38 and the sub oil pump 52. In case the input port 87 and the drain port 82 of the lock-up control valve 76 are connected, the operating oil fed to the oil passage 56 is further fed to the lubricated members 91 through the oil passage 90. The operating oil in the oil passage 41 is thus discharged to the oil passages 56 and 65 and the oil pressure in the oil passage 41 is thereby lowered, the spool 63 is moved upwardly in FIG. 1 again by the pushing force of the spring 64, and the input port 58 is thereby interrupted. Thus, the oil pressure in the oil passage 41 is controlled by the function of the secondary regulator valve 57.

Next, actions to be achieved by feeding the operating oil to the hydraulic chambers 24 and 25 will be explained hereinafter. In the modulator valve 67, the spool 72 is moved downwardly in FIG. 1 by the pushing force of the spring 73, and the input port 68 and the output port 70 are thereby connected. As a result, the operating oil in the oil passage 40 is partially fed to the oil passage 66 through the modulator valve 67, and the operating oil reaches the oil passage 66 is then fed to the hydraulic chamber 24 or 25. In case the oil pressure in the oil passage 66 is low, the spool 72 is kept pushed downwardly in FIG. 1 by the pushing force of the spring 73. To the contrary, in case the oil pressure in the oil passage 66 is raised and the oil pressure in the feedback port 71 is thereby raised, the spool 72 is moved upwardly in FIG. 1 against the pushing force of the spring 73. As a result, an opening area of the input port 68 is narrowed and the oil pressure in the oil passage 66 is lowered.

Consequently, the oil pressure in the oil passage 66 is kept to a constant pressure against the pushing force of the spring 73. Here, the oil pressure of the oil passage 66 is applied to the control port 62 of the secondary regulator valve 57 so that the pushing force is applied to the spool 63 according to the oil pressure of the control port 62 in the same direction as the pushing force of the spring 64. Therefore, in the secondary regulator valve 57, the spool 63 becomes harder to be moved downwardly in FIG. 1 according to the pressure rise in the oil passage 66. That is, the oil pressure in the oil passage 44 for opening the input port 58 is raised according to the pressure rise in the oil passage 66.

Next, a feeding route of the operating oil discharged from the sub oil pump 52 will be explained hereinafter. In case the oil pressure in the oil passage 40 is low and the oil pressure of the feedback port 47 of the primary regulator valve 42 is therefore low, the spool 49 is moved upwardly in FIG. 1 and the input port 44 is thereby interrupted. Therefore, when the operating oil is discharged from the sub oil pump 52 to the oil passage 100 and the oil pressure in the oil passage 100 is thereby raised higher than that in the oil pressure 40, the check valve 55 is opened and the operating oil discharged from the sub oil pump 52 is fed to the oil passage 40 through the oil passage 100. Then, when the oil pressure in the oil passage 40 is raised and the oil pressure of the feedback port 47 is thereby raised, the spool 49 is moved downwardly in FIG. 1. As a result, the input port 44 and the output port 46 are connected. Therefore, the operating oil discharged from the sub oil pump 52 to the oil passage 100 is fed to the oil passage 92 through the output port 46.

In case the signal pressure of the lock-up control valve 89 is raised to engage the lock-up clutch 13, the spool 96 of the changeover valve 93 is moved upwardly in FIG. 1 by the pushing force of the signal pressure, and the input port 94 and the output port 95 are thereby connected. Therefore, the operating oil in the oil passage 92 is fed to the lubricated members 91 through the output port 95. As a result, the oil pressure in the oil passage 92 becomes lower than that in the oil passage 41, and the check valve 99 is thereby closed. That is, the operating oil in the oil passage 92 will not be fed to the oil passage 41. To the contrary, in case the signal pressure of the lock-up control valve 89 is lowered to disengage the lock-up clutch 13, the spool 96 of the changeover valve 93 is moved downwardly in FIG. 1 by the pushing force of the spring 97 and the input port 94 is thereby interrupted. As a result, the oil pressure in the oil passage 92 is raised, and the check valve 99 is opened when the oil pressure in the oil passage 92 exceeds the oil pressure in the oil passage 41. Therefore, the operating oil discharged from the sub oil pump 52 is fed to the oil passage 41 so that the oil pressure in the hydraulic chamber 15 can be raised easily.

Thus, according to the example shown in FIGS. 1 and 2, in case the sub oil pump 52 is driven and the check valve 55 is opened, the operating oil discharged from the sub oil pump 52 can be fed to the primary hydraulic chamber 29 or the to the secondary hydraulic chamber 30 through the oil passage 40. Also, the operating oil discharged from the sub oil pump 52 to the oil passage 40 can be fed to the hydraulic chamber 24 or to the hydraulic chamber 25. In case the check valve 55 is closed and the input port 94 of the changeover valve 93 is interrupted, the operating oil discharged from the sub oil pump 52 can be fed to the oil passage 41 through the oil passages 100 and 92. The operating oil fed to the oil passage 41 is then partially fed to the torque converter 3 through the lock-up control valve 76. In addition, the operating oil discharged from the oil passage 41 to the oil passage 56 can be fed partially to the oil passage 90 through the lock-up control valve 76.

According to the hydraulic control unit 35 shown in FIGS. 1 and 2, the oil pressure in the oil passage 41 is controlled by the function of the secondary regulator valve 57, and the movement of the changeover valve 93 is switched according to a required amount of the operating oil to be fed to the torque converter 3 from the oil passage 41. Specifically, in case the required amount of the operating oil to be fed to the hydraulic chamber 15 is increased to disengage the lock-up clutch 13, the input port 94 of the changeover valve 93 is interrupted. That is, the oil discharging outlet 54 of the sub oil pump 52 and the hydraulic chamber 15 are connected through the oil passages 100, 92, 41 and 75. To the contrary, in case the required amount of the operating oil to be fed to the hydraulic chamber 15 is decreased (or lowered) to engage the lock-up clutch 13, the input port 94 and the output port 95 of the changeover valve 93 are connected and the check valve 99 is closed. That is, the oil discharging outlet 54 of the sub oil pump 52 is disconnected from the hydraulic chamber 15. For this reason, the operating oil will not be fed to the hydraulic chamber 15 more than required so that the power loss of the sub oil pump 52 can be reduced.

In case the sub oil pump 52 is driven and the check valve 55 is closed, the operating oil discharged from the sub oil pump 52 can be fed selectively to the lubricated members 91 or to the torque converter 3 by switching the position of the changeover valve 96 between the connecting position and the disconnecting position. That is, the operating oil discharged from the sub oil pump 52 can be fed directly to the lubricated members 91 without passing through the oil passages 40 and 41. Therefore, if the operating oil (i.e., the lubricant) is fed to the lubricated members 91 in advance from the sub oil pump 52, it is unnecessary to drive both of the main oil pump 38 and the sub oil pump 52 at high pressure, even if the rotation speed of the engine 2 drops afterward and the oil discharging amount of the main oil pump 38 is thereby decreased. For example, in case the vehicle 1 running in an urban area is stopped, or in case the vehicle 1 is running at constant low speed, the rotation speed of the engine 2 is low and the oil discharging amount of the main oil pump 38 is thereby decreased. Thus, it is possible to drive the main oil pump 38 while driving the sub oil pump 52 at low pressure. For this reason, the power loss of the power required to drive the oil pumps can be further reduced.

According to the hydraulic control unit 35 shown in FIGS. 1 and 2, a required amount of the operating oil to be fed to the torque converter 3 in case of disengaging the lock-up clutch 13 is larger than that in case of engaging the lock-up clutch 13. Specifically, as described, the plate 13A is arranged between the hydraulic chambers 14 and 15. Therefore, in case of engaging the lock-up clutch 13, the hydraulic chambers 14 and 15 are disconnected by the plate 13A. That is, the operating oil is fed only to the hydraulic chamber 14 without flowing into the hydraulic chamber 15 so that the lock-up clutch 13 can be engaged by comparatively small amount of the operating oil. To the contrary, in case of disengaging the lock-up clutch 13, the hydraulic chambers 14 and 15 are connected. Therefore, the operating oil fed to the hydraulic chamber 15 partially flows into the hydraulic chamber 14. For this reason, larger amount of the operating oil is required to disengage the lock-up clutch 13 in comparison with that in the case of engaging the lock-up clutch 13.

The oil pressure in the oil passage 92 is raised higher than that in the oil passage 41 by thus switching the position of spool 96 of the changeover valve 93. As a result, the check valve 99 is opened, and the oil discharging outlet 54 of the sub oil pump 52 is connected with the oil passage 41 through the oil passages 100 and 92. That is, the position of the spool 96 of changeover valve 93 can be switched at an instance when the signal pressure of the solenoid valve 89 is changed in case the required amount of the operating oil to be fed to the torque converter 3, that is, to the hydraulic chamber 15 is increased. Thus, response to switch the position of the spool 96 of the changeover valve 93 can be improved. In addition, the signal pressure of the solenoid valve 89 is used not only for controlling the lock-up control valve 76 but also controlling the changeover valve 93. Therefore, it is unnecessary to arrange an additional solenoid valve for controlling the changeover valve 93. Thus, a number of the elements can be reduced so that the cost is reduced. In case the lock-up clutch 13 is disengaged, the pump impeller 8 and the turbine runner 9 are rotated relatively with each other. As a result, temperature of the operating oil held in the casing 7 is raised by the friction. Therefore, temperature of the torque converter 3 may be raised. However, as described, larger amount of the operating oil is fed to the torque converter 3 in case of disengaging the lock-up clutch 13 in comparison with the case of engaging the lock-up clutch 13. Therefore, the temperature of the torque converter 3 is drawn by the operating oil so that the temperature rise of the torque converter 3 can be suppressed.

According to the example shown 1, the solenoid valve 89 is adapted to output the high signal pressure in case of engaging the lock-up clutch 13, and to output the low signal pressure in case of disengaging the lock-up clutch 13. However, the solenoid valve 89 may also be adapted to output high signal pressure in case of disengaging the lock-up clutch 13, and to output low signal pressure in case of engaging the lock-up clutch 13. In this case, the changeover valve 93 is adapted to disconnect the input port 94 and the output port 95 in case the solenoid valve 89 outputs the high signal pressure, and to connect the input port 94 and the output port 95 in case the solenoid valve 89 outputs the low signal pressure. In addition, according to this example, both of a rotative pump and a reciprocating pump may be used as the main oil pump 38 and the sub oil pump 52.

Here will be explained a relation between the elements constituting the example thus has been explained with reference to FIGS. 1 and 2 and the present invention. The oil discharging outlet 39 and 54 correspond to the "plurality of oil discharging outlets" of the present invention; the main oil pump 38 and the sub oil pump 52 correspond to the "oil pump" of the present invention; the oil discharging outlet 39 corresponds to the "first oil discharging outlet" of the present invention; the oil passage 40, the primary hydraulic chamber 29, and the secondary hydraulic chamber 30 correspond to the "high pressure route" of the present invention; the oil passages 41, 74 and 75, the oil chamber 11, the hydraulic chambers 14 and 15 correspond to the "medium pressure route" of the present invention; the oil passages 56 and 90, and the lubricated members 91 correspond to the "low pressure route" of the present invention; the oil discharging outlet 54 corresponds to the "second oil discharging outlet" of the present invention; and the primary regulator valve 42, the changeover valve 93, the check valves 55 and 99, and the oil passages 92 and 100 corresponds to the "connection mode switching mechanism" of the present invention.

In addition to above, the changeover valve 93 corresponds to the "changeover valve" of the present invention; the solenoid valve 89 and the electronic control unit 34 correspond to the "changeover valve controlling device" of the present invention; and the solenoid valve 89 corresponds to the "solenoid valve" of the present invention. Thus, the "connection mode switching mechanism" includes the valves and oil passages, and the "changeover valve controlling device" includes the solenoid valve serves as an actuator outputting the signal pressure, the electronic control unit serves as a controller for controlling the solenoid valve and so on. Further, the casing 7 and the pump impeller 8 correspond to the "input rotary member" of the present invention; the turbine runner 9 and the input shaft 10 correspond to the "output rotary member" of the present invention; and the hydraulic chamber 14 and the hydraulic chamber 15 correspond to the "hydraulic chamber" of the present invention.

Figure 3:
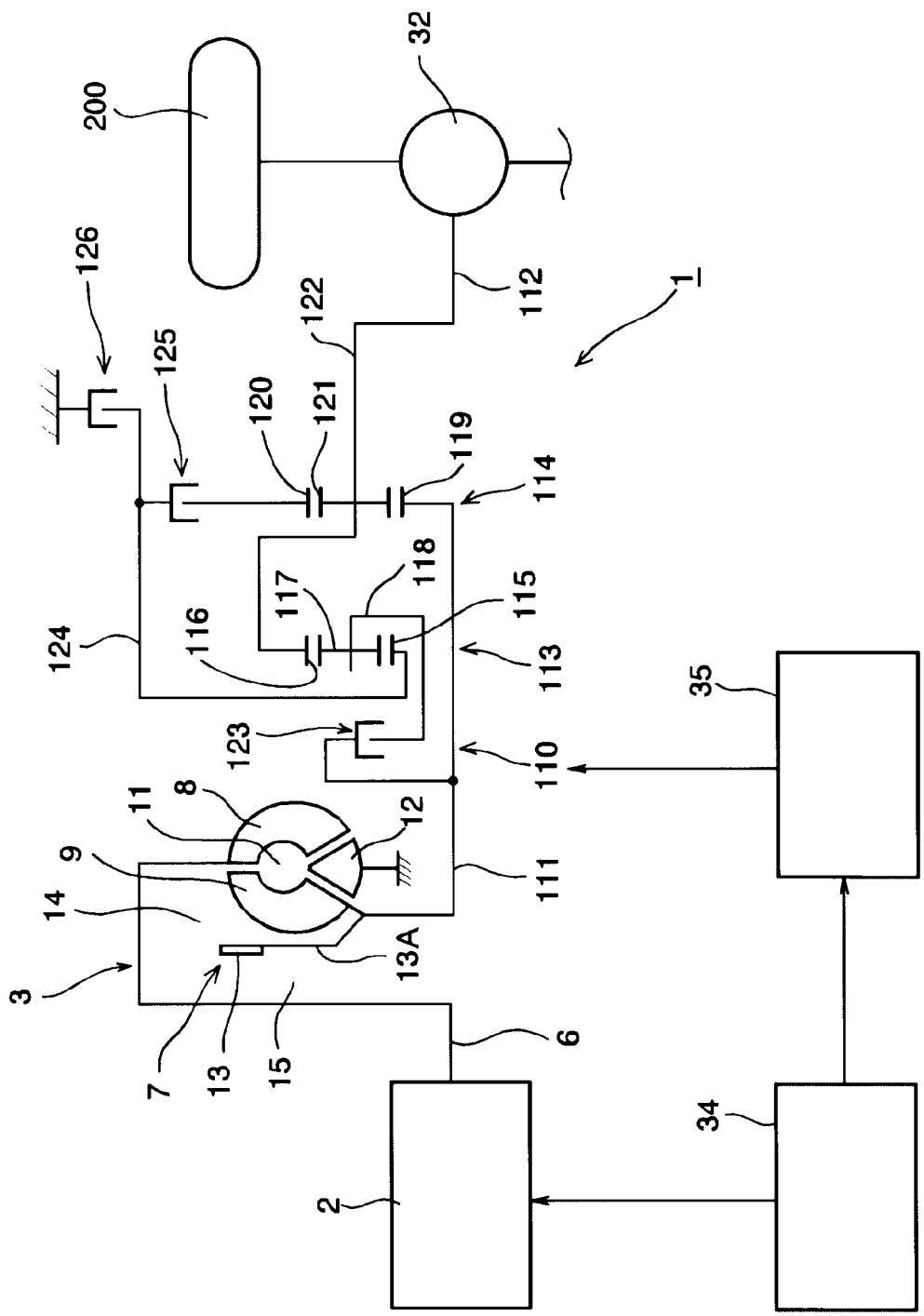
FIG. 3 is a view showing another example of a power train of a vehicle provided with the hydraulic control unit of the present invention, and a control system thereof.

Next, another example of a vehicle comprising another hydraulic control unit will be explained hereinafter with reference to FIG. 3. In FIG. 3, common reference numerals are allotted to the elements of the vehicle 1 in common with those in FIG. 2. Specifically, in the vehicle 1 shown in FIG. 3, power of an engine 2 is transmitted to a differential 32 through a torque converter 3 and a geared transmission 110, and a torque of the differential 32 is transmitted to a (front) wheel 200. The geared transmission 110 is adapted to change a gear ratio thereof stepwise (i.e., discontinuously). The geared transmission 110 comprises an input shaft 111 and an output shaft 112 arranged coaxially. Rotary axes (not shown) of the input shaft 111 and the output shaft 112 are arranged in a longitudinal direction of the vehicle 1. A plurality of planetary gear mechanisms 113 and 114 are arranged on a power transmission route from the input shaft 111 to the output shaft 112. The planetary gear mechanism 113 is a single pinion type planetary gear mechanism comprising a sun gear 115 and a ring gear 116 arranged coaxially, and a carrier 118 holding a pinion gear 117 meshing with the sun gear 115 and the ring gear 116 in a rotatable and revolvable manner.

The other planetary gear mechanism 114 is also a single pinion type planetary gear mechanism comprising a sun gear 119 and a ring gear 120 arranged coaxially, and a carrier 122 holding a pinion gear 121 meshing with the sun gear 119 and the ring gear 120 in a rotatable and revolvable manner. The ring gear 116 is connected with the carrier 122 to be rotated integrally, and the carrier 122 is connected with the output shaft 112 to be rotated integrally. The planetary gear mechanisms 113 and 114 thus structured are arranged between the input shaft 111 and the output shaft 112. The geared transmission 110 further comprises: a clutch 123 for connecting and disconnecting the carrier 118 and the input shaft 111 selectively; a clutch 125 for connecting and disconnecting the sun gear 115 and the ring gear 120 selectively through a connecting drum 124; and a brake 126 for halting the connecting drum 126 selectively. Although the geared transmission 110 further comprises frictional engagement devices (not shown) such as a one-way clutch, brake and so on, further explanation of those elements will be omitted. Here, the above-mentioned clutches 123 and 125 and the brake 126 are hydraulically controlled frictional engagement elements.

Next, another example of the hydraulic control unit will be explained hereinafter with reference to FIG. 4. As the hydraulic control unit 35 shown in FIG. 1, the hydraulic control unit shown in FIG. 4 also comprises: the primary regulator valve 42 to which the oil passages 40, 41, 92 and 100 are connected; and the solenoid valve 51 for controlling a line pressure which is connected with the signal pressure port 48 of the primary regulator valve 42. The hydraulic control unit shown in FIG. 4 further comprises: a hydraulic chamber 127 for engaging and disengaging the clutch 123; a hydraulic chamber 128 for engaging and disengaging the clutch 125; and a hydraulic chamber 129 for engaging and disengaging the brake 126. In the hydraulic control unit shown in FIG. 4, the oil passage 40 is connected with the hydraulic chambers 127, 128 and 129. That is, the operating oil in the oil passage 40 can be fed to the hydraulic chambers 127, 128 and 129.

A lock-up clutch relay valve 130 is arranged on a route from the oil passage 41 to the oil passages 74 and 75. The lock-up clutch relay valve 130 is adapted to engage and disengage the lock-up 13, and to connect the oil discharging outlet 54 of the sub oil pump 52 selectively with the oil passage for feeding the operating oil to the torque converter 3 or with the oil passage for feeding the operating oil to the lubricated members 91. The lock-up clutch relay valve 130 comprises: a spool 131 allowed to move in its axial direction; and a spring 132 for pushing the spool 131 in one of its axial directions. The lock-up clutch relay valve 130 further comprises: input ports 133, 134 and 135; output ports 137 and 138; ports 136 and 140; a signal pressure port 141; and a drain port 139. The input port 133 is connected with the lubricated members 91 through the oil passage 143, the input port 134 is connected with the oil passage 41, the input port 135 is connected with the oil passage 92, the port 136 is connected with the oil passage 74, and the port 140 is connected with the oil passage 75. Here, the drain port 139 may be connected not only with the oil pan 37 but also with the suction inlets 38A and 53.

To the signal pressure port 141, a signal pressure is inputted from an ON/OFF solenoid valve 142. The ON/OFF solenoid valve 142 is adapted to switch the pressure of the signal pressure to output between high signal pressure and low signal pressure depending on the situation when it is energized to be turned ON or when it is not energized to be turned OFF. Specifically, a current value of the ON/OFF solenoid valve 142 is controlled by the electronic control unit 34, and the signal pressure to be outputted is switched between high and low pressures according to the current value. A pushing force for pushing the spool 131 against the pushing force of the spring 132 (i.e., downwardly in FIG. 4) is established according to the oil pressure of the signal pressure port 141. For example, in case the signal pressure port 141 is controlled to output the high signal pressure, the spool 131 is pushed downwardly in FIG. 4 and stopped at an ON position shown in the right half of the lock-up clutch relay valve 130 in FIG. 4. To the contrary, in case the signal pressure port 141 is controlled to output the low signal pressure, the spool 131 is pushed upwardly in FIG. 4 by the pushing force of the spring 132, and stopped at an OFF position shown in the left half of the lock-up clutch relay valve 130 in FIG. 4.

Next, a lock-up clutch control valve 144 connected with the lock-up clutch relay valve 130 is to be explained hereinafter. The lock-up clutch control valve 144 is a mechanism adapted to connect the hydraulic chamber 15 with the oil passage 41 or with the oil passage 74 selectively. The lock-up clutch control valve 144 comprises: a spool 145 allowed to move in its axial direction; a spring 146 for pushing the spool 145 in one of its axial directions; an input port 147; an output port 148; and control ports 149 and 150. The control port 149 is connected with the oil passage 74, therefore, a pushing force is applied to the spool 145 in the same direction as the pushing force of the spring 146 according to the oil pressure of the control port 149.

On the other hand, the other control port 150 is connected with the oil passage 75, therefore, a pushing force is applied to the spool 145 in the direction opposite to the pushing force of the spring 146 according to the oil pressure of the control port 150. The input port 147 is connected with the output port 137, and the output port 148 is connected with the oil passage 41. Between the oil passages 41 and 143, there is arranged a secondary regulator valve 151. The secondary regulator valve 151 is a pressure control valve for controlling the oil pressure in the oil passage 41, and the secondary regulator valve 151 comprises an input port 152 and an output port 153. The input port 152 is connected with the oil passage 41, and the output ports 153 and 138 are connected with the oil passage 143.

Next, a specific control example of the hydraulic control unit 35 shown in FIGS. 3 and 4 will be explained hereinafter. When the main oil pump 38 is driven, the operating oil is discharged from the oil discharging outlet 39 to the oil passage 40. Meanwhile, when the sub oil pump 52 is driven, the operating oil is discharged from the oil discharging outlet 54 to the oil passage 100. First of all, a feeding route of the operating oil discharged from the main oil pump 38, and actions in the feeding route are to be explained. A speed change ratio, that is, a gear stage of the geared transmission 110 is set according to a selected shift position of the geared transmission 110 and a speed change map stored in the electronic control unit 34. The gear stage of the geared transmission 110 is controlled by controlling the clutches 123 and 125 and the brake 126. Specifically, in case the oil pressure in the hydraulic chamber 127 is raised, the clutch 123 is engaged. To the contrary, in case the oil pressure in the hydraulic chamber 127 is lowered, the clutch 123 is disengaged. In case the oil pressure in the hydraulic chamber 128 is raised, the clutch 125 is engaged. To the contrary, in case the oil pressure in the hydraulic chamber 128 is lowered, the clutch 125 is disengaged. In case the oil pressure in the hydraulic chamber 129 is raised, the clutch 126 is engaged. To the contrary, in case the oil pressure in the hydraulic chamber 129 is lowered, the clutch 126 is disengaged. For example, the gear stage of the geared transmission 110 can be shifted selectively within four forward stages and one reverse stage, by thus controlling the clutches 123 and 125, and brake 126.

The oil pressure in the oil passage 40 (i.e., a line pressure) is controlled by the function of the primary regulator valve 42, as in the case of the example shown in FIG. 1. Also, the operating oil in the oil passage 40 is fed partially to the oil passage 41 by the function of the primary regulator valve 42. Here will be explained a control for feeding the operating oil in the oil passage 41 to the torque converter 3 through the lock-up clutch relay valve 130. In case of engaging the lock-up clutch 13, the signal pressure to be outputted form the ON/OFF solenoid valve 142 is raised. Consequently, the spool 139 of the lock-up clutch relay valve 130 is moved downwardly in FIG. 4 and stopped at the ON position. In this situation, the input port 133 and the drain port 139 are connected, the input port 134 and the port 136 are connected, the port 140 and the output port 137 are connected, and the input port 135 and the output port 138 are connected. As a result, the operating oil fed to the oil passage 41 is further fed to the oil chamber 11 and the hydraulic chamber 14 via the oil passage 74, and the oil pressure in the hydraulic chamber 14 is thereby raised. On the other hand, the operating oil fed to the oil passage 74 is partially fed to the control valve 149 of the lock-up clutch control valve 144. As a result, the oil pressure of the control port 149 is raised, and the pushing force pushing the spool 145 upwardly in FIG. 4 is increased.

When the oil pressure in the hydraulic chamber 14 is raised, a capacity of the hydraulic chamber 15 is narrowed thereby discharging the operating oil therein to the oil passage 75, and the discharged oil is fed to the input port 147 through the output port 137. The operating oil discharged to the oil passage 75 is partially flows into the control port 150 of the lock-up clutch control valve 144. In case the spool 139 of the lock-up clutch relay valve 130 is thus stopped at the ON position, the grater pushing force is applied to the spool 145 upwardly in FIG. 4, and the spool 145 is thereby moved upwardly in FIG. 4. As a result, the input port 147 and the output port 148 are connected. Therefore, the operating oil fed from the oil passage 75 to the input port 147 is further fed to the oil passage 41 via the output port 148. Thus, the feeding amount of the operating oil to the hydraulic chamber 14 is increased thereby raising the oil pressure in the hydraulic chamber 14, and the oil pressure in the hydraulic chamber 15 is lowered. As a result, the lock-up clutch 13 is engaged.

Next, a control for disengaging the lock-up clutch 13 will be explained hereinafter. In this case, the signal pressure outputted from the ON/OFF solenoid valve 142 is lowered, and the spool 131 is thereby moved upwardly in FIG. 4 and stopped at the OFF position. As a result, the input port 133 is interrupted, the drain port 139 and the port 136 are connected, the input port 134 and the port 140 are connected, the output port 137 is interrupted, the input port 135 is interrupted, and the output port 138 is interrupted. Therefore, the operating oil in the oil passage 41 is fed to the hydraulic chamber 15 though the port 140 and the oil passage 75. As a result, the oil pressure in the hydraulic chamber 15 is raised. On the other hand, the operating oil in the hydraulic chamber 14 is discharged from the drain port 139 via the oil passage 74. In this situation, the operating oil in the oil passage 75 is fed partially to the control port 150 and the oil pressure in the control port 150 is thereby raised to push the spool 145 downwardly in FIG. 4. As a result, the operating oil in the control port 149 is discharged from the drain port 139 through the oil passage 74. Therefore, the spool 145 is moved downwardly in FIG. 4 and the output port 148 is thereby interrupted. Thus, the oil pressure in the hydraulic chamber 14 is lowered, and the oil pressure in the hydraulic chamber 15 raised. As a result, the lock-up clutch 13 is disengaged.

Here will be explained a feeding route of the operating oil discharged from the sub oil pump 52. In case the oil pressure in the oil passage 40 is low, the check valve 55 is opened by the principle explained in the explanation of FIG. 1, and the operating oil discharged from the sub oil pump 52 is fed to the oil passage 40 through the oil passage 100. To the contrary, in case the oil pressure in the oil passage 40 is raised, the operating oil discharged from the sub oil pump 52 to the oil passage 100 is fed to the oil passage 92 through the output port 46.

Here will be explained a case in which the spool 139 of the lock-up clutch relay valve 130 is stopped at the ON position to engage the lock-up clutch 13. In this case, the input port 135 and the output port 138 are connected. Therefore, the operating oil fed to the oil passage 92 from the sub oil pump 52 is further fed to the oil passage 143 through the input port 135 and the output port 138. As a result, the oil pressure in the oil passage 92 becomes lower than that in the oil passage 41, and the check valve 55 is thereby closed. Accordingly, the operating oil in the oil passage 92 will not be fed to the oil passage 41. In this situation, the operating oil fed to the oil passage 143 is fed partially to the lubricated members 91. Here, in case the spool 139 is stopped at the ON position, the input port 133 and the drain port 139 are connected. Therefore, the operating oil in the oil passage 143 is partially discharged from the drain port 139. Also, the operating oil discharged from the oil passage 41 to the oil passage 143 through the secondary regulator valve 151 is fed to the lubricated members 91 and to the drain port 139.

Next, here will be explained a case in which the spool 139 of the lock-up clutch relay valve 130 is stopped at the OFF position to disengage the lock-up clutch 13. In this case, the input port 135 is interrupted so that the operating oil is fed from the sub oil pump 52 to the oil passage 92, and the oil pressure in the oil passage 92 is thereby raised. When the oil pressure in the oil passage 92 becomes higher than that in the oil passage 41, the check valve 99 is opened and the operating oil discharged from the sub oil pump 52 is fed to the oil passage 41. The operating oil fed to the oil passage 41 is further fed to the oil passage 75 through the input port 134 and the port 140, and the operating oil is then fed from the oil passage 75 to the hydraulic chamber 15. In addition, in the hydraulic control unit 35 shown in FIG. 4, the oil pressure in the oil passage 41 is also lower than that in the oil passage 40, and the oil pressure in the oil passage 143 is also lower than that in the oil passage 41, as in the hydraulic control unit 35 shown in FIG. 1.

Figure 4:
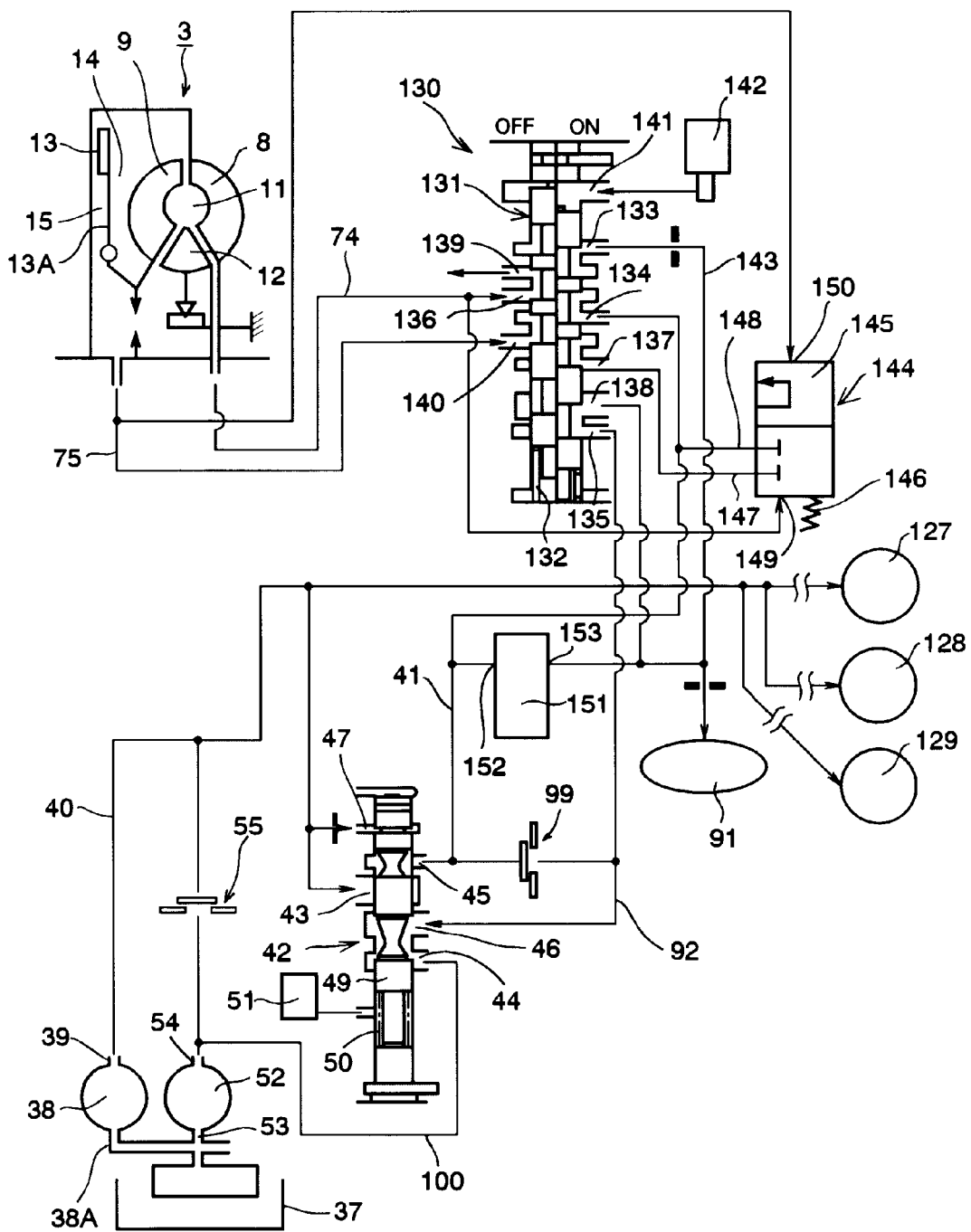
FIG. 4 is a view showing an exemplary embodiment of the hydraulic control unit shown in FIG. 3.

Thus, according to the hydraulic control unit 35 shown in FIGS. 3 and 4, in case the sub oil pump 52 is driven and the check valve 55 is opened, the operating oil discharged from the sub oil pump 52 can be fed to the hydraulic chambers 127, 128 and 129 through the oil passage 40. Moreover, in case the check valve 55 is closed, the input port 44 and the output port 46 of the primary regulator valve 42 are connected, the spool 131 of the lock-up clutch relay valve 130 is stopped at the ON position, and the check valve 99 is closed, the operating oil discharged from the sub oil pump 52 can be fed to the oil passage 143 through the oil passages 100 and 92. The operating oil in the oil passage 143 can be further fed to the lubricated members 91 and to the drain port 139.

According to the hydraulic control unit 35 shown in FIGS. 3 and 4, in case the check valve 55 is closed, the input port 44 and the output port 46 are connected, and the spool 131 of the lock-up clutch relay valve 130 is stopped at the OFF position, the oil pressure in the oil passage 92 is raised and the check valve 99 is thereby opened. Therefore, the operating oil fed from the oil passage 92 to the oil passage 41 can be further fed to the torque converter 3, that is, to the hydraulic chamber 15 through the lock-up clutch relay valve 130. For this reason, the operating oil will not be fed to the hydraulic chamber more than necessary so that the power loss of the sub oil pump 52 can be reduced.

Moreover, in case the sub oil pump 52 is driven and the check valve 55 is closed, the operating oil discharged from the sub oil pump 52 can be fed selectively to the lubricated members 91 or to the hydraulic chamber 15 by switching the position of the spool 131 between the ON position and the OFF position. Therefore, if the operating oil (or lubricating oil) has been fed from the sub oil pump 52 to the lubricated members 91 in advance, it is unnecessary to select "two pumps driving mode" in which both of the main oil pump 38 and the sub oil pump 52 are driven, even in case the rotational speed of the engine 2 is lowered and the oil discharging amount of the main oil pump 38 is decreased. For example, in case the vehicle 1 stops and starts frequently when running in an urban area, or in case the vehicle 1 is running at constant low speed, the rotation speed of the engine 2 is low and the oil discharging amount of the main oil pump 38 is thereby decreased. However, according to the present invention, it is possible to select "one pump driving mode" in which the main oil pump 38 is driven but the sub oil pump 52 is halted, even under the above explained situation. For this reason, loss of the power for driving the oil pump can be further reduced.

As explained in the explanation of the example shown in FIGS. 1 and 2, in the hydraulic control unit 35 shown in FIGS. 3 and 4, larger amount of the operating oil is also required to be fed to the torque converter 3 (i.e., the oil required amount) in case of disengaging the lock-up clutch 13, in comparison with that in the case of engaging the lock-up clutch 13. Therefore, in the hydraulic control unit 35 shown in FIGS. 3 and 4, the oil discharging outlet 54 of the sub oil pump 52 is connected selectively with the lubricated members 91 or with the hydraulic chamber 15, by changing the signal pressure of the ON/OFF solenoid valve 142 to switch the position of the spool 131 of the lock-up clutch relay valve 130. As a result, the position of the spool 131 is switched at an instance when the signal pressure of the ON/OFF solenoid valve 142 is changed in case the required amount of the operating oil to be fed to the hydraulic chamber 15 is increased. Thus, the response to switch the position of the spool 131 can be improved.

Further, the signal pressure of the ON/OFF solenoid valve 142 is used not only for engaging and disengaging the lock-up clutch 13 but also for switching the oil passage to be connected with the oil discharging outlet 54 of the sub oil pump 52. Therefore, it is unnecessary to arrange an additional solenoid valve for switching the oil passage to be connected with the oil discharging outlet 54 of the sub oil pump 52. Thus, a number of the parts can be reduced so that the cost can be suppressed. As described, in case the lock-up clutch 13 is disengaged, the pump impeller 8 and the turbine runner 9 are rotated relatively with each other. As a result, the temperature of the operating oil held in the casing 7 is raised by the friction and the temperature of the torque converter 3 is thereby raised. However, according to the hydraulic control unit 35 shown in FIGS. 3 and 4, larger amount of the operating oil is fed to the torque converter 3 in case of disengaging the lock-up clutch 13 in comparison with that in the case of engaging the lock-up clutch 13. Therefore, the temperature of the torque converter 3 is drawn by the operating oil so that the temperature rise of the torque converter 3 can be prevented.

Furthermore, according to the hydraulic control unit 35 shown in FIGS. 3 and 4, the ON/OFF solenoid valve 142 is adapted to output the high signal pressure in case of engaging the lock-up clutch 13, and to output the low signal pressure in case of disengaging the lock-up clutch 13. However, the ON/OFF solenoid valve 142 may also be adapted to output high signal pressure in case of disengaging the lock-up clutch 13, and to output low signal pressure in case of engaging the lock-up clutch 13. In this case, positions of the signal pressure port 141 and the spring 132 are to be switched.

Here will be explained a relation between the elements constituting the example thus has been explained with reference to FIGS. 3 and 4 and the present invention. The oil passage 40 and the hydraulic chambers 127, 128 and 129 correspond to the "high pressure route" of the present invention; the oil passages 41, 74 and 75, the oil chamber 11, the hydraulic chamber 14 and the hydraulic chamber 15 correspond to the "medium pressure route" of the present invention; the oil passages 143, the lubricated members 91, and the drain port 139 correspond to the "low pressure route" of the present invention; the primary regulator valve 42, the lock-up clutch relay valve 130, the check valves 55 and 99, and the oil passages 41, 92 and 100 corresponds to the "connection mode switching mechanism" of the present invention; the lock-up clutch relay valve 130 corresponds to the "changeover valve" of the present invention; and the ON/OFF solenoid valve 142 and the electronic control unit 34 correspond to the "changeover valve controlling device" of the present invention. Thus, the "connection mode switching mechanism" includes the valves and oil passages, and the "changeover valve controlling device" includes the solenoid valve serves as an actuator outputting the signal pressure, the electronic control unit serves as a controller for controlling the solenoid valve and so on. The remaining elements of the example shown in FIGS. 3 and 4 are identical to those of the example shown in FIGS. 1 and 2.

The invention claimed is:

1. A hydraulic control unit having an oil pump, comprising:
   a plurality of oil discharging outlets, a high pressure route connected with a first oil discharging outlet of said plurality of oil discharging outlets:
   a medium pressure route, an oil pressure therein is lower than that in the high pressure route;
   a low pressure route, an oil pressure therein is lower than that in the medium pressure route; and
   a connection mode switching mechanism for selectively connecting a second oil discharging outlet of said plurality of oil discharging outlets with the high pressure route, the medium pressure route or the low pressure route, wherein:
   the connection mode switching mechanism comprises a changeover valve for selectively connecting the second oil discharging outlet with the medium pressure route or the low pressure route; and
   the hydraulic control unit comprises a changeover valve controlling device for switching a connection mode of the second oil discharging outlet by controlling the changeover valve on the basis of a required amount of operating oil to be fed to the medium pressure route, between:
   a first connection mode in which the second oil discharging outlet is connected with the medium pressure route and disconnected from the low pressure route; and
   a second connection mode in which the second oil discharging outlet is connected with the low pressure route and disconnected from the medium pressure route.

2. The hydraulic control unit as claimed in claim 1, wherein:
   the vehicle comprises a hydraulic power transmission, which is adapted to transmit power between an input rotary member and an output rotary member thereof by a kinetic energy of fluid, and which is arranged on a power transmission route from a prime mover of a vehicle to a wheel;
   the hydraulic power transmission comprises a lock-up clutch for transmitting the power frictionally between the input rotary member and the output rotary member, a hydraulic chamber for engaging the lock-up clutch, and a hydraulic chamber for disengaging the lock-up clutch;
   the operating oil in the medium pressure route is fed to the hydraulic chamber for engaging the lock-up clutch and to the hydraulic chamber for disengaging the lock-up clutch;
   the lock-up clutch is adapted to be disengaged in case the oil pressure in the hydraulic chamber for disengaging the lock-up clutch is raised, and to be engaged in case the oil pressure in the hydraulic chamber for engaging the lock-up clutch is raised; and
   the changeover valve controlling device selects the first connection mode in case of disengaging the lock-up clutch, and selects the second connection mode in case of engaging the lock-up clutch.

3. The hydraulic control unit as claimed in claim 1, wherein:
   the connection mode switching mechanism is adapted to connect the second oil discharging outlet with the high pressure route in case an additional amount of the operating oil is required to be fed to the high pressure route, while disconnecting the second oil discharging outlet from the medium pressure route and the low pressure route.

4. The hydraulic control unit as claimed in claim 1, further comprising:
   a solenoid valve for outputting a signal pressure for engaging and disengaging the lock-up clutch; and
   wherein the changeover valve controlling device is adapted to selectively switch the connection mode between the first and the second connection modes by controlling the changeover valve by the signal pressure outputted from the solenoid valve.

* * * * *